United States Patent Office 3,322,798
Patented May 30, 1967

3,322,798
PROCESS FOR OBTAINING PURE METHYL AZE-LAALDEHYDATE FROM OZONOLYSIS OF COMMERCIAL METHYL OLEATE
William R. Miller and Danny Joe Moore, Peoria, Ill., assignors to the United States of America as represented by the Secretary of Agriculture
No Drawing. Filed May 14, 1964, Ser. No. 367,600
1 Claim. (Cl. 260—410.9)

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for obtaining methyl azelaaldehydate in extremely pure form and free of the similarly boiling aldehydic impurities that are also formed when commercial methyl oleate is ozonized and the ozonolysis products then subjected to reductive decomposition.

Methyl azelaaldehydate, a versatile intermediate for the preparation of polyester acetals, polyamides, and other synthetic resins, is a major product from the ozonolysis and reductive decomposition of methyl oleate. Although reductive decomposition of the ozonolysis product from pure methyl oleate is known to give only two compounds, viz, methyl azelaaldehydate and pelargonaldehyde, which are readily separated by simple distillation inasmuch as their boiling points differ by about 50° C., this is not the case when the desired methyl azelaaldehydate is formed from commercial methyl oleate, which contains only about 79 percent methyl oleate, plus 8 percent of the corresponding linoleate, 5 percent of the palmitate, and smaller amounts of the palmitoleate, myristate, stearate, and linolenate esters.

It can therefore be appreciated that reductive decomposition of the ozonolysis product from commercial methyl oleate gives an unusually heterogenous mixture also comprising (A) the laurate, myristate, palmitate, and stearate methyl esters, (B) aldehydes and aldehyde esters derived from the original polyunsaturated esters, (C) homologs derived from positional isomers of the unsaturated esters, e.g., palmitoleic, and (D) acetals, condensation and oxidation products, and esters like dimethyl azelate, which are formed by decomposition of methoxy hydroperoxides over certain hydrogenation catalysts. Since pure methyl azelaaldehydate is frequently required, a process for obtaining it from commercial methyl oleate is desirable.

It was found that simple distillation through a Vigreaux column of the above described complex mixture from commercial methyl oleate gave Fraction I, boiling range 28–94° C./3 mm. and comprising pelargonaldehyde, homologous aldehydes, their acetals, and lower esters, Fraction II, boiling range 65–118° C./0.5 mm. and by GLC analysis comprising about 79 percent crude methyl azelaaldehydate including traces of methyl azelaaldehydate dimethyl acetal, 1.4 percent pelargonaldehyde, 4.4 percent dimethyl azelate, 4.7 percent $C_{11}$ aldehyde ester, 6.9 percent methyl myristate, 0.3 percent $C_{13}$ aldehyde ester, 1.0 percent methyl palmitate, and 2.4 percent of unknowns, and a residue fraction containing higher fatty esters and condensation products.

It is well known that sodium bisulfite complexes with aldehydic compounds to form crystalline addition compounds and thus would selectively complex methyl azelaaldehydate together with the other aldehydic compounds, pelargonaldehyde, the $C_{11}$ aldehyde ester, and the $C_{13}$ aldehyde ester, in the presence of methyl azelaaldehydate dimethyl acetal, dimethyl azelate, and fatty acid methyl esters. However, it was unobvious that regeneration of the bisulfite complexed compounds would give a mixture which, in contrast to the original mixture, could be separated easily by simple fractional distillation to provide the desired methyl azelaaldehydate in extremely pure form.

Accordingly, the object of this invention is an improved distillation process for obtaining high yields of pure methyl azelaaldehydate from the ozonoylsis products of commercial methyl oleate.

In accordance with the above object we have discovered that pure methyl azelaaldehydate can be obtained by treating the above described distillate fraction boiling at 65–118° C./0.5 mm. with an aqueous-methanolic saturated solution of sodium bisulfite to form a crystalline adduct therewith, washing the crystals of addition compound with a volatile organic solvent to remove $C_{14}$ and $C_{16}$ fatty acid methyl ester, diester, and acetal contaminants, treating the washed adduct with aqueous alkali to regenerate the aldehyde ester, extracting the regenerated methyl azelaaldehydate with ether, flashing the ether, and distilling to obtain the desired highly pure methyl azelaldeyhdate.

The following detailed example is intended to illustrate our invention.

Example

Commercial methyl oleate was ozonized and catalytically reduced by the procedure of Pryde et al., Jour. Org. Chem. 27: 3055 (1962). The product (1907 g.) was distilled through a Vigreaux column to give Fraction I, boiling range 28–94° C./3 mm. and 692 g. of Fraction II, boiling range 65–118° C./0.5 mm. Fraction II, analyzing 79 percent methyl azelaaldehydate, was added slowly and with vigorous stirring to a saturated solution of sodium bisulfite (576 g. of sodium metabisulfite dissolved in 1000 ml. of water to which 840 ml. of absolute methanol was added). After 3 hours of stirring at room temperature the crystals of addition compound were obtained by filtration, slurried in three changes of ether to remove occluded contaminants, and filtered. The methyl azelaaldehydate was regenerated from the bisulfite addition compound by shaking the latter in 1 liter of 10 percent NaOH solution which was successively extracted with equal volumes of ether, the ether serving to remove the methyl azelaaldehydate from the aqueous layer and thus shift the equilibrium in the direction of the free aldehyde while also minimizing possible saponification of the ester and condensation of the aldehyde functions. The combined ether extracts were washed with water until neutral and dried over anhydrous $CaSO_4$. The ether was then stripped off, and the residue distilled through a 15 cm. helix-packed column at 85–86° C./0.2 mm. to provide 448 g. of methyl azelaaldehydate having a purity of 99.8 percent by GLC analysis. Based on the 79 percent content in the bisulfite treated fraction, the yield of methyl azelaaldehydate was 82.5 percent.

We claim:

In a distillation process for obtaining methyl azelaaldehydate from the heterogenous product formed by subjecting commercial methyl oleate to ozonization followed by reductive decomposition of the ozonized intermediates, the improvement comprising the steps of distilling to remove a first fraction boiling at 28–94° C./3 mm. and isolate a fraction boiling at 65–118° C./0.5 mm., treating the latter fraction with a saturated aqueous-methanolic solution of sodium bisulfite, isolating the resulting crystals of bisulfite addition compound, dissolving the crystals in 10 percent NaOH solution, extracting the methyl azelaaldehydate regenerated therein with successive additions of ether, washing the pooled ether fractions with water to remove residual alkali, stripping off the ether solvent, and distilling at 85–86° C./0.2 mm. to obtain methyl azelaaldehydate having a purity of about 99.8 percent.

No references cited.

ALEX MAZEL, *Primary Examiner.*

HENRY R. JILES, *Examiner.*